US012565585B2

(12) United States Patent
Sabard et al.

(10) Patent No.: US 12,565,585 B2
(45) Date of Patent: Mar. 3, 2026

(54) POLYAMIDE COMPOSITIONS COMPRISING REINFORCING FIBERS AND HAVING HIGH MODULUS STABILITY, AND USES THEREOF

(71) Applicant: Arkema France, Colombes (FR)

(72) Inventors: Mathieu Sabard, Serquigny (FR); Benoît Brule, Serquigny (FR); Stefania Cassiano Gaspar, Serquigny (FR); Clémence Pace, Kyoto (JP)

(73) Assignee: ARKEMA FRANCE, Puteaux (FR)

( * ) Notice: Subject to any disclaimer, the term of this patent is extended or adjusted under 35 U.S.C. 154(b) by 765 days.

(21) Appl. No.: 17/642,311

(22) PCT Filed: Sep. 16, 2020

(86) PCT No.: PCT/FR2020/051597
§ 371 (c)(1),
(2) Date: Mar. 11, 2022

(87) PCT Pub. No.: WO2021/053292
PCT Pub. Date: Mar. 25, 2021

(65) Prior Publication Data
US 2022/0340753 A1 Oct. 27, 2022

(30) Foreign Application Priority Data

Sep. 19, 2019 (FR) ...................................... 1910309
Feb. 27, 2020 (FR) ...................................... 2001933

(51) Int. Cl.
*C08L 77/02* (2006.01)
(52) U.S. Cl.
CPC ......... *C08L 77/02* (2013.01); *C08L 2205/025* (2013.01); *C08L 2205/06* (2013.01)
(58) Field of Classification Search
CPC .. C08G 69/36; C08K 7/14; C08K 7/06; C08L 2205/025; C08L 2205/06
See application file for complete search history.

(56) References Cited

U.S. PATENT DOCUMENTS

2008/0167415 A1 7/2008 Stoeppelmann
2008/0274355 A1 11/2008 Hewel

2010/0249307 A1 9/2010 Stoppelmann
2010/0279111 A1 11/2010 Philipp
2011/0195215 A1 8/2011 Briffaud et al.
2011/0206881 A1 8/2011 Briffaud et al.
2017/0107337 A1 4/2017 Stoppelmann et al.
2018/0155545 A1* 6/2018 Stöppelmann .......... C08L 77/06
2019/0085164 A1 3/2019 Sabard et al.
2019/0241738 A1 8/2019 Brule et al.
2019/0241739 A1 8/2019 Brule et al.
2020/0199360 A1 6/2020 Sabard et al.

FOREIGN PATENT DOCUMENTS

CN 105269779 A 1/2016
CN 108779329 A 11/2018
JP 2008163340 A 7/2008
JP 2011503307 A 1/2011
WO 2010015785 A1 2/2010
WO 2010015786 A1 2/2010
WO 2014195226 A1 12/2014
WO 2018073536 A1 4/2018
WO 2018073537 A1 4/2018
WO 2019008288 A1 1/2019
WO 2019122061 A1 6/2019

OTHER PUBLICATIONS

Office Action mailed on Aug. 15, 2024, by the Japanese Patent Office (JPO) for Japanese Application No. 2022-517960, 11 pages.
International Search Report (PCT/ISA/210) and Written Opinion (PCT/ISA/237) mailed on Dec. 10, 2020, by the European Patent Office as the International Searching Authority for International Application No. PCT/FR2020/051597. (16 pages).

* cited by examiner

*Primary Examiner* — Ana L. Woodward
(74) *Attorney, Agent, or Firm* — Boone IP Law

(57) ABSTRACT

The present invention relates to the use of a mixture of at least one semi-crystalline aliphatic polyamide and at least one amorphous polyamide, wherein the at least one semi-crystalline aliphatic polyamide is obtained by polycondensation: of at least one $C_6$ to $C_{18}$, preferentially $C_{10}$ to $C_{18}$, more preferentially $C_{10}$ to $C_{12}$ amino acid, or at least one $C_6$ to $C_{18}$, preferentially $C_{10}$ to $C_{18}$, more preferentially $C_{10}$ to $C_{12}$ lactam, or at least one $C_4$-$C_{36}$, preferentially $C_5$-$C_{18}$, preferentially $C_5$-$C_{12}$, more preferentially $C_{10}$-$C_{12}$ diamine Ca, with at least one $C_4$-$C_{36}$, preferentially $C_6$-$C_{18}$, preferentially $C_6$-$C_{12}$, more preferentially $C_{10}$-$C_{12}$ dicarboxylic acid Cb; in order to prepare a semi-crystalline composition, the modulus of which does not vary by more than 25% within the temperature range from 10° C. to 40° C.

20 Claims, No Drawings

POLYAMIDE COMPOSITIONS COMPRISING REINFORCING FIBERS AND HAVING HIGH MODULUS STABILITY, AND USES THEREOF

TECHNICAL FIELD

The present patent application relates to the use of semi-crystalline aliphatic and amorphous polyamides for the manufacture of compositions having a high modulus stability under the effect of temperature and humidity, the method for their manufacture, and the said compositions.

PRIOR ART

Many applications in the E/E field require the use of high modulus polymer materials, e.g. for televisions, digital cameras, digital games, telephone parts, digital tablets, drones, printers, or computer parts. The modulus of the material is indeed a crucial factor to allow for lower weight, since it enables a reduction in the thickness of the parts while maintaining high rigidity. A distinction is made between different moduli (e.g. tensile modulus, flexural modulus, etc.). These moduli can be impacted by temperature and by the moisture level in the sample.

It is also important that the stiffness is little affected by changes in temperature or by the water content of the material. Indeed, the stability of the modulus is also an important factor for the subsequent use or to ensure easy assembly of the parts when such assembly carried out in places where the temperature and/or the humidity can be high.

Thus, polyamide compositions are sought whose modulus remains stable over the range of temperatures and/or humidity to which they are exposed, particularly during assembly of the parts and subsequent operation of the devices. Preferably, the modulus must be stable at a temperature of 10° C. to 40° C., in particular in the temperature range of 0° C. to 40° C., in particular in the temperature range of −10° C. to 40° C. for compositions having variable water content (caused by conditioning the compositions in an atmosphere where the hygrometry may vary from 0 to 100%, or in liquid water)

In addition, the polyamide compositions must have moderate molding temperatures, and crystallize sufficiently quickly to allow a processing time, especially a cycle time, suitable for an industrial process.

However, aliphatic polyamides generally experience a significant loss of rigidity when the temperature rises, especially when these polyamides have been conditioned in a humid atmosphere beforehand because they contain a certain amount of water.

It is known from application WO 2018/073536 that a semi-aromatic polyamide, in particular an MXDZ polyamide, is used in a blend of aliphatic polyamide, in particular a semi-crystalline polyamide, comprising glass fibers with a circular cross-section, in order to limit the warping of the resulting composition.

It is also known from international application WO 2018/073537 that circular-section glass fibers are used in a blend comprising at least one MXDZ polyamide and at least one aliphatic polyamide, in particular a semi-crystalline polyamide, to improve the mechanical properties of the said composition, in particular the elongation at break, after it has been processed, in particular by injection or compression molding.

Furthermore, document WO 10/015785 describes copolyamides comprising at least two distinct A/XT units, characterized in that the said copolyamide has an amine chain end content of greater than or equal to 20 µeq/g, an acid chain end content of less than or equal to 100 µeq/g and a nonreactive chain end content of greater than or equal to 20 µeq/g. The copolyamide may comprise additives, in particular reinforcing fibers, which reinforcing fibers may be glass fibers.

Document WO 10/015786 describes copolyamides comprising at least two A/10T units, characterized in that it has a polymolecularity index, denoted Ip, of less than or equal to 3.5, measured by gel permeation chromatography.

International application WO 2014/195226 describes compositions for an electronic mobile apparatus comprising at least 20% of at least one polymer and at least 20% of glass fibers having a non-circular cross-section and an elastic modulus of at least 76 GPa determined according to ASTM C1557-03.

None of these prior art documents mention the stability of the modulus as a function of temperature and of the preconditioning of the compositions.

This leaves the problem of providing a polyamide-based formulation that combines a high modulus that is stable over a wide temperature range, even when the composition is saturated with water, with good injection-moldability.

SUMMARY OF THE INVENTION

The purpose of the invention is therefore to provide amorphous semi-crystalline polyamide mixtures for the manufacture of compositions with high modulus stability under the effect of temperature and humidity.

Also, according to a first aspect, one object of the invention is the use of a mixture of at least one semi-crystalline aliphatic polyamide and at least one amorphous polyamide, wherein said semi-crystalline aliphatic polyamide is obtained by polycondensation:

of at least one $C_6$ to $C_{18}$, preferentially $C_{10}$ to $C_{18}$, more preferentially $C_{10}$ to $C_{12}$, amino acid, or of at least one $C_6$ to $C_{18}$, preferentially $C_{10}$ to $C_{18}$, more preferentially $C_{10}$ to $C_{12}$, lactam, or of at least one $C_4$-$C_{36}$, preferentially $C_5C_{18}$, preferentially $C_5C_{12}$, more preferentially $C_{10}$-$C_{12}$, aliphatic diamine Ca with at least one $C_4$-$C_{36}$, preferentially $C_6$-$C_{18}$, preferentially $C_6$-$C_{12}$, more preferentially $C_{10}$-$C_{12}$ alphatic dicarboxylic acid Cb;

for preparing a semi-crystalline composition whose modulus does not vary by more than 25% in the temperature range from 10° C. to 40° C., in particular in the temperature range from 0° C. to 40° C., especially in the temperature range from −10° C. to 40° C.

Advantageously, the Tg of said semi-crystalline composition, determined by DMA according to ISO 6721-11:2019, shows an increase greater than or equal to 5° C., preferentially greater than or equal to 10° C., more preferentially greater than or equal to 15° C., with respect to the initial Tg of said semi-crystalline polyamide before mixing.

The Tg of said semi-crystalline composition above, is determined in a dry or humid atmosphere, advantageously under saturated atmosphere in water at 65° C.

Advantageously, the Tg of said semi-crystalline composition, as determined by DMA is from 5° C. to 120° C., advantageously from 10° C. to 120° C., more advantageously from 15° C. to 120° C.

The Tg is determined by dynamic mechanical analysis (DMA) according to ISO standard 6721-11:2019.

The inventors unexpectedly found that the selection of a semi-crystalline aliphatic polyamide and at least one amorphous polyamide, in a specific proportion, makes it possible to prepare a composition whose modulus not only exhibits stability under the effect of temperature and humidity, and does not vary by more than 25% in the temperature range from 10° C. to 40° C., in particular in the temperature range from 0° C. to 40° C., especially in the temperature range from −10° C. to 40° C., but also whose processing is facilitated by a low molding temperature, in particular below 100° C., preferably below 90° C., more preferentially below 80° C., and by a short cycle time during its implementation, particularly less than or equal to 50 s.

They also found that this selection of a blend of semi-crystalline aliphatic polyamide and at least one amorphous polyamide, in a specific proportion, increased the Tg of the composition over that of semi-crystalline aliphatic polyamide alone while maintaining the semi-crystalline character of the composition.

The nomenclature used to define the polyamides is described in ISO standard 1874-1:2011 "Plastiques—Matériaux polyamides (PA) pour moulage et extrusion—Partie 1: Désignation", especially on page 3 (Tables 1 and 2) and is well known to the person skilled in the art.

A semi-crystalline copolyamide, in the sense of the invention, denotes a polyamide that has a glass transition temperature as determined by dynamic mechanical analysis (DMA) according to ISO standard 6721-11:2019 as well as a melting temperature (Tm) determined according to ISO standard 11357-3:2013, and a crystallization enthalpy during the cooling step at a rate of 20 K/min in DSC measured according to ISO standard 11357-3 of 2013 greater than 30 J/g, preferably greater than 35 J/g.

An amorphous polyamide, in the sense of the invention, denotes a polyamide that has only a glass transition temperature (not a melting temperature (Tm)), or a polyamide that has very little crystallinity having a glass transition temperature and a melting point such that the crystallization enthalpy during the cooling step at a rate of 20 K/min measured according to standard ISO 11357-3:2013 is less than 30 J/g, in particular less than 20 J/g, preferably less than 15 J/g.

In one embodiment, the semi-crystalline aliphatic polyamide is linear.

In one embodiment, the semi-crystalline aliphatic polyamide is a homopolyamide, particularly a semi-crystalline linear aliphatic homopolyamide.

Advantageously, the amorphous polyamide used in the invention has a Tg of from 100 to 200° C., in particular from 120 to 190° C.

When said at least one semi-crystalline aliphatic polyamide is obtained from the polycondensation of at least one lactam, said at least one lactam may be selected from a $C_6$ to $C_{18}$ lactam, preferentially $C_{10}$ to $C_{18}$, more preferentially $C_{10}$ to $C_{12}$. A $C_6$ to $C_{12}$ lactam especially is caprolactam, decanolactam, undecanolactam, and lauryllactam.

When said at least one semi-crystalline aliphatic polyamide is obtained from the polycondensation of at least one lactam, it may therefore comprise a single lactam or several lactams.

Advantageously, said at least one semi-crystalline aliphatic polyamide is obtained from the polycondensation of a single lactam and said lactam is selected from lauryllactam and undecanolactam, advantageously lauryllactam.

When said at least one semi-crystalline aliphatic polyamide is obtained from the polycondensation of at least one amino acid, said at least one amino acid may be selected from a $C_6$ to $C_{18}$ amino acid, preferentially $C_{10}$ to $C_{18}$, more preferentially $C_{10}$ to $C_{12}$.

An amino acid $C_6$ to $C_{12}$ is especially 6-aminohexanoic acid, 9-aminononanoic acid, 10-aminodecanoic acid, 10-aminoundecanoic acid, 12-aminododecanoic acid and 11-aminoundecanoic acid and derivatives thereof, especially N-heptyl-11-aminoundecanoic acid.

When said at least one semi-crystalline aliphatic polyamide is obtained from the polycondensation of at least one amino acid, it may therefore comprise a single amino acid or several amino acids.

Advantageously, said semi-crystalline aliphatic polyamide is obtained from the polycondensation of a single amino acid and said amino acid is selected from 11-aminoundecanoic acid and 12-aminododecanoic acid, advantageously 11-aminoundecanoic acid.

When said at least one semi-crystalline aliphatic polyamide is obtained from the polycondensation of at least one $C_4$-$C_{36}$, preferentially $C_5$-$C_{18}$, preferentially $C_5$-$C_{12}$, more preferentially $C_{10}$-$C_{12}$, diamine Ca with at least one $C_4$-$C_{36}$, preferentially $C_6$-$C_{18}$, preferentially $C_6$-$C_{12}$, more preferentially $C_{10}$-$C_{12}$, diacid Cb, then said at least one diamine Ca is an aliphatic diamine and said at least one diacid Cb is an aliphatic diacid.

The diamine may be linear or branched. Advantageously, it is linear.

Said at least one $C_4$-$C_{36}$ diamine Ca can be in particular selected from 1,4-butanediamine, 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine 1,12-dodecamethylenediamine, 1,13-tridecamethylenediamine, 1,14-tetradecamethylenediamine, 1,16-hexadecamethylenediamine and 1,18-octadecamethylenediamine, octadecenediamine, eicosanediamine, docosanediamine and the diamines obtained from fatty acids.

Advantageously, said at least one diamine Ca is $C_5$-$C_{18}$ and selected from 1,5-pentamethylenediamine, 1,6-hexamethylenediamine, 1,7-heptamethylenediamine, 1,8-octamethylenediamine, 1,9-nonamethylenediamine, 1,10-decamethylenediamine 1,11-undecamethylenediamine, 1,12-dodecamethylenediamine, 1,13-tridecamethylenediamine, 1,14-tetradecamethylenediamine, 1,16-hexadecamethylenediamine and 1,18-octadecamethylenediamine.

Advantageously, said at least one $C_5$ to $C_{12}$ Ca diamine is particularly chosen from 1,5-pentamethylenediamine, 1,6-hexamethylene diamine, 1,7-heptamethylediamine, 1,8-octamethylediamine, 1,9-nonamethylediamine, 1,10-decamethylediamine, 1,11-undecamethylediamine, and 1,12-dodecamethylediamine.

Advantageously, the diamine Ca used is a $C_{10}$ to $C_{12}$ diamine, particularly chosen from 1,10-decamethylenediamine, 1,11-undecamethylenediamine, and 1,12-dodecamethylenediamine.

Said at least one $C_4$ to $C_{36}$ dicarboxylic acid Cb may be selected from succinic acid, glutaric acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and diacids obtained from fatty acids.

The diacid may be linear or branched. Advantageously, it is linear.

Advantageously, said at least one Cb dicarboxylic acid is $C_6$ to $C_{18}$ and is chosen from adipic acid, suberic acid, azelaic acid, sebacic acid, undecanedioic acid, dodecanedioic acid, brassylic acid, tetradecanedioic acid, pentade-canedioic acid, hexadecanedioic acid, octadecanedioic acid.

Advantageously, said at least one Cb dicarboxylic acid is $C_6$ to $C_{12}$ and can be chosen from adipic acid, suberic acid, azelaic acid, sebacic acid, undecanedioic acid, and dode-canedioic acid.

Advantageously, said at least one Cb dicarboxylic acid is $C_{10}$ to $C_{12}$ and is chosen from sebacic acid, undecanedioic acid and dodecanedioic acid.

When said semi-crystalline aliphatic polyamide is obtained from the polycondensation of at least one diamine Ca with at least one dicarboxylic acid Cb and may therefore comprise a single diamine or a plurality of diamines and a single dicarboxylic acid or several dicarboxylic acids.

Advantageously, said semi-crystalline aliphatic poly-amide is obtained from the polycondensation of a single diamine Ca with a single dicarboxylic acid Cb.

When said at least one amorphous polyamide is a homopolyamide of formula XY or a copolyamide of formula A/XY, then XY is a repeating unit obtained by polyconden-sation of at least one cycloaliphatic diamine (X) and at least one $C_4$-$C_{36}$, preferentially $C_6$-$C_{18}$, preferentially $C_6$-$C_{12}$, more preferentially $C_{10}$-$C_{12}$ aliphatic dicarboxylic acid (Y) or of at least one aromatic dicarboxylic acid (Y) and A is a repeating unit obtained by polycondensation of at least one $C_6$ à $C_{18}$, preferentially $C_{10}$ à $C_{18}$, more preferentially $C_{10}$ à $C_{12}$, amino acid, or of at least one $C_6$ to $C_{18}$, preferentially Ci 0 to $C_{18}$, more preferentially $C_{10}$ to $C_{12}$, lactam, or of at least one $C_4$-$C_{36}$, preferentially $C_5$-$C_{18}$, preferentially $C_5$-$C_{12}$, more preferentially Ci 0-$C_{12}$, Ca diamine with at least one $C_4$-$C_{36}$, preferentially $C_6$-$C_{18}$, preferentially $C_6$-$C_{12}$, more preferentially $C_{10}$-$C_{12}$ dicarboxylic acid Cb.

The cycloaliphatic diamine (X) may be chosen from bis(3,5-dialkyl-4-aminocyclohexyl)-methane, bis(3,5-dial-kyl-4-aminocyclohexyl)ethane, bis(3,5-dialkyl-4-aminocy-clohexyl)-propane, bis(3,5-dialkyl-4-aminocyclo-hexyl)-butane, bis-(3-methyl-4-aminocyclohexyl)-methane or 3,3'-dimethyl-4,4'-diamino-dicyclohexyl-methane commonly called "BMACM" or "MACM" (and denoted B below), p-bis(aminocyclohexyl)-methane commonly called "PACM" (and denoted P hereinafter), particularly Dicy-kan®, isopropylidenedi(cyclohexylamine) commonly called "PACP", isophorone-diamine (denoted IPD hereinafter) and 2,6-bis(amino methyl)norbornane commonly called "BAMN," and bis(aminomethyl)cyclohexane "BAC", in particular 1,3-BAC, or in particular 1,4-BAC.

Advantageously, it is chosen from bis-(3-methyl-4-ami-nocyclohexyl)-methane or 3,3'-dimethyl-4,4'-diamino-dicy-clohexyl-methane, commonly called (BMACM) or (MACM) (and denoted B hereinafter) bis(p-aminocyclo-hexyl)-methane commonly referred to as (PACM) (and denoted P hereinafter) and bis(aminomethyl)cyclohexane (BAC), in particular 1,3-BAC, or in particular 1,4-BAC.

A, Ca, and Cb are as defined above.

When (Y) is at least one $C_4$-$C_{36}$, preferentially $C_6$-$C_{18}$, preferentially $C_6$-$C_{12}$, more preferentially $C_{10}$-$C_{12}$ aliphatic dicarboxylic acid, it is as defined for Cb.

When (Y) is at least one aromatic dicarboxylic acid (Y), it is advantageously selected from terephthalic acid (denoted T), isophthalic acid (denoted I) and 2,6-naphthalene dicar-boxylic acid (denoted N) or mixtures thereof; in particular it is selected from terephthalic acid (denoted T), isophthalic acid (denoted I) or mixtures thereof.

The modulus of a composition varies with temperature and in general, the modulus decreases with increasing tem-perature.

The expression "the modulus does not vary by more than 25% in the temperature range from 10° C. to 40° C., in particular in the temperature range from 0° C. to 40° C., especially in the temperature range from −10° C. to 40° C." means that in these temperature ranges from 10° C. to 40° C., 0° C. to 40° C., and −10° C. to 40° C., the modulus of the same composition, whether it is the flexural modulus or the tensile modulus measured after identical conditioning (dry or wet atmosphere), does not vary by more than 25%.

Advantageously, the modulus of said composition does not vary by more than 35% in the temperature range of −10° C. to 50° C.

The expression "the modulus does not vary by more than 35% in the temperature range from −10° C. to 50° C." means that in this range from −10° C. to 50° C., the modulus of the same composition, whether it is the flexural modulus or the tensile modulus measured after identical conditioning (dry or wet atmosphere), does not vary by more than 35%.

More advantageously, the modulus of said composition does not vary by more than 40% in the temperature range of −10° C. to 60° C.

The expression "the modulus does not vary by more than 40% in the temperature range from −10° C. to 60° C." means that in the range from −10° C. to 60° C., the modulus of the same composition, whether it is the flexural modulus or the tensile modulus measured after identical conditioning (dry or wet atmosphere), does not vary by more than 40%.

The term "wet conditioning" means after saturation in liquid water at 65° C.

In other words, $M_{-10}$ being the modulus measured at −10° C. and $M_T$ the modulus measured at a temperature T for a composition conditioned under the same dry or wet atmo-sphere conditions, then:

$$((M_{-10}-M_T)/M_{-10}) \times 100 \leq 25\%, \text{ with } T \text{ varying from } -10 \text{ to } 40° \text{ C.}$$

In one embodiment, the modulus is measured as defined above according to ISO 178:2010 and corresponds to the flexural modulus.

In another embodiment, the modulus is measured as defined above according to ISO 2:2012 and corresponds to the tensile modulus.

In another embodiment, the modulus corresponds to both the flexural modulus and the tensile modulus, both measured as defined hereinbefore.

Advantageously, the change in the flexural modulus, measured at 20° C. on a sample saturated in water at 65° C. and measured at 20° C. on a dry sample, is less than or equal to 15%, in particular less than or equal to 7%, both mea-surements being carried out according to ISO 178:2010.

In other words, $(M_{sec}-M_{sat}) \times 100/M_{sec} \leq 15\%$.

In one embodiment, said at least one amorphous poly-amide is a homopolyamide of formula XY or a copolyamide of formula A/XY, XY being a repeating unit obtained by polycondensation of at least one cycloaliphatic diamine (X) and at least one $C_4$-$C_{36}$, preferentially $C_6$-$C_{18}$, preferentially $C_6$-$C_{12}$, more preferentially $C_{10}$-$C_{12}$ aliphatic dicarboxylic acid (Y) or of at least one aromatic dicarboxylic acid (Y) and A is a repeating unit obtained by polycondensation of at least one $C_6$ à $C_{18}$, preferentially $C_{10}$ à $C_{18}$, more preferentially $C_{10}$ à $C_{12}$, amino acid, or of at least one $C_6$ to $C_{18}$, preferentially $C_{10}$ to $C_{18}$, more preferentially $C_{10}$ to $C_{12}$, lactam, or of at least one $C_4$-$C_{36}$, preferentially $C_5$-$C_{18}$, preferen-tially $C_5$-$C_{12}$, more preferentially $C_{10}$-$C_{12}$, Ca diamine with at least one $C_4$-$C_{36}$, preferentially $C_6$-$C_{18}$, preferentially $C_6$-$C_{12}$, more preferentially $C_{10}$-$C_{12}$ dicarboxylic acid Cb.

In a first variant, said at least one amorphous polyamide is a copolyamide of formula A/XY, A being obtained by polycondensation of at least one amino acid or obtained by polycondensation of at least one lactam, X being selected from B or P or BAC and Y being terepthalic and/or isophthalic acid.

Advantageously, in this first variant, A/XY is selected from the units 11/BI/BT, 12/BI/BT, 11/BACI/BACT, 12/BACI/BACT, 11/BACI, 12/BACI, 11/PI/PT, 12/PI/PT and a mixture thereof.

In a second variant, said at least one amorphous polyamide is a copolyamide of formula A/XY, A being obtained by polycondensation of at least one amino acid or obtained by polycondensation of at least one lactam, X being selected from B or P and Y being sebacic acid or dodecandioic acid.

Advantageously, in this second variant, A/XY is selected from 11/B10, 11/B12, 11/P10, 11/P12, 12/B10, 12/B12, 12/P10, 12/P12, and a mixture thereof.

In a third variant, said at least one amorphous polyamide is a copolyamide of formula A/XY, A being obtained by polycondensation of at least one diamine Ca with at least one dicarboxylic acid Cb, X being selected from B or P and Y being sebacic acid or dodecandioic acid.

Advantageously, in this third variant, wherein A/XY is selected from 1010/B10, 1010/B12, 1010/P10, 1010/P12, 1012/B10, 1012/B12, 1012/P10, 1012/P12, 1210/B10, 1210/B12, 1210/P10, 1210/P12, 1212/B10, 1212/B12, 1212/P10, 1212/P12, and a mixture thereof.

In a fourth variant, said at least one amorphous polyamide is a homopolyamide of formula XY, where X is selected from B or P and Y is sebacic acid or dodecanedioic acid.

Advantageously, in this fourth variant, XY is selected from units B10, B12, P10, P12, and one of their mixtures.

In one embodiment, the proportion by weight of said amorphous polyamide is from 10 to 45%, preferentially from 15 to 35% by weight, more preferentially from 20 to 30% by weight with respect to the sum by weight of said at least one semi-crystalline polyamide and said at least one amorphous polyamide.

In another embodiment, the present invention relates to the use of a mixture of at least one semi-crystalline aliphatic polyamide and of at least one amorphous polyamide to prepare a semi-crystalline composition as defined hereinbefore, said composition comprising 35 to 75% by weight of reinforcing fibers, in particular from 35 to 65% by weight of reinforcing fibers.

The composition according to the invention may include short reinforcing fibers or short fibrous reinforcing fibers.

Glass beads are excluded from the definition of reinforcing fibers.

Preferably, the fibers are short and between 2 and 13 mm long, preferably 3 to 8 mm long before the compositions are used.

These short reinforcing fibers may be chosen from:
natural fibers
mineral fibers, those having high melting temperatures Tm' greater than the melting temperature Tm of said semi-crystalline polyamide of the invention and greater than the implementation temperature.
polymeric or polymer fibers having a melting temperature Tm' or if not Tm', a glass transition temperature Tg', greater than the melting temperature Tm of said semi-crystalline polyamide constituting said matrix of thermoplastic material and greater than the implementation temperature.
or mixtures of the fibers cited above.

Examples of mineral fibers suitable for the invention are carbon fibers, which includes fibers of nanotubes or carbon nanotubes (CNT), carbon nanofibers or graphenes; silica fibers such as glass fibers, in particular type D, E, R, S2, or T; boron fibers; ceramic fibers, in particular silicon carbide fibers, boron carbide fibers, boron carbonitride fibers, silicon nitride fibers, boron nitride fibers, basalt fibers or basalt-based fibers; fibers or filaments containing metals and/or their alloys; metal oxide fibers, in particular of alumina ($Al_2O_3$); metalized fibers such as metalized glass fibers and metalized carbon fibers or mixtures of previously cited fibers.

More particularly, these fibers can be chosen as follows:
the mineral fibers may be chosen from: carbon fibers, carbon nanotube fibers, glass fibers, in particular type D, E, R, S2, or T, boron fibers, ceramic fibers, in particular silicon carbide fibers, boron carbide fibers, boron carbonitride fibers, silicon nitride fibers, boron nitride fibers, basalt fibers or basalt-based fibers; fibers or filaments containing metals and/or their alloys, fibers containing metal oxides such as $Al_2O_3$, metalized fibers such as metalized glass fibers and metalized carbon fibers or mixtures of above-mentioned fibers, and
the polymer or polymeric fibers, under the previously cited condition above, are chosen from:
the thermosetting polymer fibers and more particularly chosen from: unsaturated polyesters, epoxy resins, vinyl esters, phenol resins, polyurethanes, cyanoacrylates and polyimides, such as bis-maleimide resins, aminoplasts resulting from the reaction of an amine such as melamine with an aldehyde such as glyoxal or formaldehyde;
fibers of thermoplastic polymers and more particularly chosen from: polyethylene terephthalate (PET), polybutylene terephthalate (PBT);
polyamide fibers;
aramid fibers (such as Kevlar®) and aromatic polyamides such as those having one of the formulas: PPD.T, MPD.I, PAA and PPA, with PPD and MPD being respectively p- and m-phenylene diamine, PAA being polyarylamides and PPA being polyphthalamides,
fibers of polyamide block copolymers such as polyamide/polyether, fibers of polyarylether ketones (PAEK) such as polyetherether ketone (PEEK), polyetherketone ketone (PEKK), polyetherketoneetherketone ketone (PEKEKK).

Preferred short reinforcing fibers are short fibers chosen from: carbon fibers, including metalized fibers, glass fibers, including metalized glass fibers like E, R, S2 or T, aramid fibers (like Kevlar®) or aromatic polyamides, polyarylether ketone (PAEK) fibers, such as polyetherether ketone (PEEK), polyetherketone ketone (PEKK) fibers, polyetherketoneetherketone ketone (PEKEKK) fibers or mixtures thereof.

More particularly, natural fibers are chosen from flax, castor, wood, sisal, kenaf, coconut, hemp and jute fibers.

Glass fiber within the meaning of the invention are understood to be any glass fiber, in particular that described by Frederick T. Wallenberger, James C. Watson and Hong Li, PPG industries Inc. (ASM Handbook, Vol 21: composites (#06781G), 2001 ASM International).

The reinforcing fiber may be:

either with a circular cross-section with a diameter of between 4 μm and 25 μm, preferably between 4 and 15 μm.

or with a non-circular cross-section having a L/D ratio (where L represents the largest dimension of the cross-section of the fiber and D the smallest dimension of the cross-section of said fiber) between 2 and 8, particularly between 2 and 4. L and D can be measured by scanning electron microscopy (SEM).

Advantageously, the reinforcing fibers are selected from glass fibers, carbon fibers, and a mixture thereof.

Advantageously, the reinforcing fiber is selected from a glass fiber with a non-circular cross-section, a glass fiber with a circular cross-section, a carbon fiber and a mixture thereof.

Advantageously, the reinforcing fiber is selected from a glass fiber with a non-circular cross-section, a glass fiber with a circular cross-section and a mixture thereof.

Advantageously, the reinforcing fiber is a glass fiber with a circular cross-section.

In another embodiment, said composition comprises, in addition to the semi-crystalline aliphatic polyamide, amorphous polyamide, and reinforcing fibers:

from 0 to 10% by weight of at least one impact modifier;

from 0 to 30% by weight of at least one filler; and from 0 to 10% by weight of at least one fluidifying agent; and from 0 to less than 2%, preferably 0.5 to less than 2% by weight of additives, the sum of semi-crystalline aliphatic polyamide, amorphous polyamide, reinforcing fibers, impact modifier, filler, fluidifying agent and additives being equal to 100%.

In yet another embodiment, said composition consists of the semi-crystalline aliphatic polyamide, amorphous polyamide, and reinforcing fibers, and:

from 0 to 10% by weight of at least one impact modifier;

from 0 to 30% by weight of at least one filler; and from 0 to 10% by weight of at least one fluidifying agent; and from 0 to less than 2%, preferably 0.5 to less than 2% by weight of additives, the sum of semi-crystalline aliphatic polyamide, amorphous polyamide, reinforcing fibers, an impact modifier, filler, fluidifying agent and additives being equal to 100%.

In another embodiment, said composition comprises, in addition to the semi-crystalline aliphatic polyamide, amorphous polyamide, and reinforcing fibers:

from 0 to 10% by weight of at least one impact modifier;

from 1 to 30% by weight of at least one filler; and from 0 to 10% by weight of at least one fluidifying agent; and from 0 to less than 2%, preferably 0.5 to less than 2% by weight of additives, the sum of semi-crystalline aliphatic polyamide, amorphous polyamide, reinforcing fibers, impact modifier, filler, fluidifying agent and additives being equal to 100%.

In yet another embodiment, said composition consists of the semi-crystalline aliphatic polyamide, amorphous polyamide, reinforcing fibers, and:

from 0 to 10% by weight of at least one impact modifier;

from 1 to 30% by weight of at least one filler; and from 0 to 10% by weight of at least one fluidifying agent; and from 0 to less than 2%, preferably 0.5 to less than 2% by weight of additives, the sum of semi-crystalline aliphatic polyamide, amorphous polyamide, reinforcing fibers, an impact modifier, filler, fluidifying agent and additives being equal to 100%.

Advantageously, the proportion of filler in these compositions is from 5 to 30% by weight, in particular from 10 to 30% by weight, preferentially from 15 to 30% by weight.

In one embodiment, the proportion of filler in these compositions is from 0 to 28% by weight, in particular from 1 to 28% by weight, from 5 to 28% by weight, in particular from 10 to 28% by weight, preferentially from 15 to 28% by weight.

The expression "impact modifier" means a polyolefin based polymer having a flexural modulus less than 100 MPa measured according to the standard ISO 178:2010 (23° C. RH50) and Tg below 0° C. (measured according to the standard 11357-2:2013 at the level of the inflection point of the DSC thermogram), in particular a polyolefin.

The impact modifier may also be a PEBA block polymer (polyether-block-amide) having a flexural modulus <200 MPa.

The impact modifier may also be a SEBS polyolefin.

The composition may further comprise one or more impact modifiers as defined above. The presence of an impact modifier makes it possible to confer greater ductility on the articles manufactured.

The polyolefin of the impact modifier may be functionalized or non-functionalized or may comprise both in admixture.

When the polyolefin is functionalized, some or all of the polyolefins carry a function selected from carboxylic acid, carboxylic anhydride and epoxide functions. The polyolefin may in particular be chosen from an ethylene and propylene copolymer with elastomeric character (EPR), an ethylene-propylene-diene copolymer with elastomer character (EPDM) and an ethylene/alkyl (meth)acrylate copolymer, a higher ethylene-alkene copolymer, particularly an ethylene-octene copolymer, an ethylene-alkyl acrylate-maleic anhydride terpolymer.

Peba (polyether block amides) are copolymers containing polyamide and polyether blocks. They may also contain ester functions, in particular resulting from the condensation reaction of terminal carboxylic functions of the polyamide blocks with the hydroxyl functions of the polyether blocks. Peba is commercially available, in particular under the brand name Pebax® by the company Arkema.

Advantageously, the impact modifier is chosen from Fusabond® F493, a Pebax®, particularly Pebax® 40R53 SP01, a Lotader®, Exxelor® VA1803 or VA1801, Orevac® IM800, or a mixture of these, in which case they are in a ratio ranging from 0.1/99.9 to 99.9/0.1.

The impact modifier can also be a core-shell modifier, also denoted a core-shell polymer. The "core-shell modifier" is presented in the form of fine particles having an elastomer core and at least one thermoplastic shell; the particle size is generally less than a μm and advantageously inclusively between 150 and 500 nm. The core-shell modifier has an acrylic or butadiene base.

Several different impact modifiers may be present in the composition.

According to certain embodiments, the content of impact modifier relative to the total weight of the composition may vary from 0 to 10% by weight, advantageously from 1 to 10% by weight.

According to one embodiment, the composition comprises from 1 to 8%, and in particular from 2 to 5% by weight of impact modifier relative to the total weight of the composition.

In another embodiment, the content of impact modifier in the composition may vary from 1 to 2% by weight; or from 2 to 3% by weight; or from 3 to 4% by weight; or from 4 to 5% by weight; or from 5 to 6% by weight; or from 6 to 7% by weight; or from 7 to 8% by weight; or from 8 to 9% by weight; or from 9 to 10% by weight.

Regarding Fillers:

The composition may also contain fillers. The intended fillers include glass beads, particularly solid or hollow ones, traditional mineral fillers, such as kaolin, magnesium, slag, carbon black, expanded or unexpanded graphite, wollastonite, nucleating agents such as silica, alumina, clay, or talc, in particular talc, pigments such as titanium oxide and zinc sulfide, antistatic fillers, flame-retardant fillers, in particular a halogen-free flame retardant, as described in US 2008/0274355 and in particular a phosphorus-based flame retardant, for example a metal salt selected from a metal salt of phosphinic acid, in particular dialkyl phosphinate salts, in particular aluminium diethylphosphinate salt or aluminium diethylphosphinate salt, a metal salt of diphosphinic acid, a mixture of aluminium phosphinate flame retardant and a nitrogen synergist or a mixture of aluminium phosphinate flame retardant and a phosphorus synergist, a polymer containing at least one metal salt of phosphinic acid, in particular on an ammonium basis, such as ammonium polyphosphate, sulphamate or pentaborate, or on a melamine basis, such as melamine, melamine salts, melamine pyrophosphates and melamine cyanurates, or on a cyanuric acid basis, or a polymer containing at least one metal salt of diphosphinic acid or red phosphorus, antimony oxide, zinc oxide, iron oxide, magnesium oxide or metal borates such as zinc borate, or phosphazene, phospham or phosphoxynitride or a mixture thereof. The flame-retardant fillers may also be halogenated flame retardants such as a brominated or polybrominated polystyrene, a brominated polycarbonate or a brominated phenol.

It is understood that glass beads are not reinforcing fibers.

The composition may also comprise fluidifying agents.

The term "fluidifying agent" particularly includes prepolymers.

The prepolymer may be selected from linear or branched aliphatic, cycloaliphatic, semi-aromatic or aromatic polyamide oligomers. The prepolymer may also be a copolyamide oligomer or a mixture of polyamide and copolyamide oligomers. Preferably, the prepolymer has a number average molecular weight Mn from 1000 to 10000 g/mol, in particular from 1000 to 5000 g/mol. In particular, it can be monofunctional $NH_2$ if the chain limiter used is a monoamine for example. The number average molecular weight (Mn) or amine number is calculated according to the following formula: $Mn=1000/[NH_2]$, $[NH_2]$ being the concentration of amine functions in the copolyamide as determined, for example, by potentiometry.

According to certain embodiments, the content of fluidifying agent relative to the total weight of the composition may vary from 0 to 10% by weight, in particular from 1 to 10% by weight, especially from 5 to 10%.

According to one embodiment, the composition comprises from 1 to 5%, and in particular from 1 to 4% by weight of fluidifying agent relative to the total weight of the composition.

According to another embodiment, the content of fluidifying agent relative to the total weight of the composition is from 1 to 2% by weight; or from 2 to 3% by weight; or from 3 to 4% by weight; or from 4 to 5% by weight.

The term "additives" means dyes, stabilizers, surfactants, brighteners, antioxidants, lubricants, waxes and mixtures thereof.

The stabilizers may be organic or mineral stabilizers. Typical stabilizers used with polymers include phenols, phosphites, UV absorbers, HALS (Hindered Amine Light Stabilizer) stabilizers and metal iodides. Examples include Irganox® 1010, 245, 1098 from BASF, Irgafos® 168, 126 from BASF, Tinuvin® 312, 770 from BASF, Iodide P201 from Ciba, and Nylostab® S-EED from Clariant.

The lubricants may contain a stearate or wax binder.

The waxes can particularly be an amorphous wax, such as beeswax, a silicone wax, a polyethylene wax, an oxidized polyethylene wax, an ethylene copolymer, a montan wax and a polyether wax.

Several different additives of the same or different categories may be present in the composition.

The additive content is from 0 to less than 2% by weight relative to the total weight of the composition.

According to one embodiment, the composition comprises from 0.1 to less than 2%, and in particular from 0.5 to less than 2% by weight of additive in relation to the total weight of the composition.

According to some embodiments, the additive content in the composition may vary from 0 to 0.5% by weight; or from 0.1 to 0.5% by weight; or from 0.5 to 1% by weight; or from 1 to 1.5% by weight; or from 1.5 to less than 2% by weight.

According to a second aspect, the invention relates to a composition, in particular useful for injection molding, comprising:

from 25 to 65%, in particular from 35 to 65%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 0 to 30% by weight of at least one filler; and from 0 to 10% by weight of at least one fluidifying agent; and from 0 to less than 2%, preferably from 0.1 to less than 2%, in particular 0.5 to less than 2% by weight of additives;

the sum of the proportions of each constituent of said composition being equal to 100%.

All the characteristics defined above for the use of the mixture to prepare a composition are valid for the composition as such.

The reinforcing fibers, impact modifiers, fillers, fluidifying agents and additives are as defined hereinbefore and all the concentration ranges relating to the impact modifiers, fluidifying agents, fillers and additives, defined hereinbefore, are also valid for said composition as such.

Advantageously, said composition, in particular useful for injection molding, consists of:

from 25 to 65%, in particular from 35 to 65%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 0 to 30% by weight of at least one filler; and from 0 to 10% by weight of at least one fluidifying agent; and from 0 to less than 2%, preferably from 0.1 to less than 2%, in particular 0.5 to less than 2% by weight of additives;

the sum of the proportions of each constituent of said composition being equal to 100%.

Advantageously, said composition, in particular useful for injection molding, consists of:

from 25 to 64.9%, in particular from 35 to 64.9%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 0 to 30% by weight of at least one filler; and from 0 to 10% by weight of at least one fluidifying agent; and from 0.1 to less than 2% by weight of additives;

the sum of the proportions of each constituent of said composition being equal to 100%.

Advantageously, said composition, in particular useful for injection molding, consists of:

from 25 to 64.5%, in particular from 35 to 64.5%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 0 to 30% by weight of at least one filler;

from 0 to 10% by weight of at least one fluidifying agent; and from 0.5 to less than 2% by weight of additives;

the sum of the proportions of each constituent of said composition being equal to 100%.

Advantageously, said composition, in particular useful for injection molding, consists of:

from 25 to 63.9%, in particular from 35 to 63.9%, by weight of a mixture of at least one semi-crystalline aliphatic polyamide and at least one amorphous polyamide as defined above, from 35 to 75%, in particular from 35 to 65% by weight of reinforcing fibers;

from 1 to 10% by weight of at least one impact modifier;

from 0 to 30% by weight of at least one filler;

from 0 to 10% by weight of at least one fluidifying agent; and from 0.1 to less than 2% by weight of additives;

the sum of the proportions of each constituent of said composition being equal to 100%.

Advantageously, said composition, in particular useful for injection molding, consists of:

from 25 to 63.5%, in particular from 35 to 63.5%, by weight of a mixture of at least one semi-crystalline aliphatic polyamide and at least one amorphous polyamide as defined above, from 35 to 75%, in particular from 35 to 65% by weight of reinforcing fibers;

from 1 to 10% by weight of at least one impact modifier;

from 0 to 30% by weight of at least one filler;

from 0 to 10% by weight of at least one fluidifying agent; and from 0.5 to less than 2% by weight of additives;

the sum of the proportions of each constituent of said composition being equal to 100%.

Advantageously, said composition, in particular useful for injection molding, consists of:

from 25 to 63.9%, in particular from 35 to 63.9%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 1 to 30% by weight of at least one filler;

from 0 to 10% by weight of at least one fluidifying agent; and from 0.1 to less than 2% by weight of additives;

the sum of the proportions of each constituent of said composition being equal to 100%.

Advantageously, said composition, in particular useful for injection molding, consists of:

from 25 to 63.5%, in particular from 35 to 63.5%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 1 to 30% by weight of at least one filler;

from 0 to 10% by weight of at least one fluidifying agent; and from 0.5 to less than 2% by weight of additives;

the sum of the proportions of each constituent of said composition being equal to 100%.

Advantageously, said composition, in particular useful for injection molding, consists of:

from 25 to 63.9%, in particular from 35 to 63.9%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 0 to 30% by weight of at least one filler;

from 1 to 10% by weight of at least one fluidifying agent; and from 0.1 to less than 2% by weight of additives;

the sum of the proportions of each constituent of said composition being equal to 100%.

Advantageously, said composition, in particular useful for injection molding, consists of:

from 25 to 63.5%, in particular from 35 to 63.5%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 0 to 30% by weight of at least one filler;

from 1 to 10% by weight of at least one fluidifying agent; and from 0.5 to less than 2% by weight of additives;

the sum of the proportions of each constituent of said composition being equal to 100%.

Advantageously, said composition, in particular useful for injection molding, consists of:

from 25 to 62.9%, in particular from 35 to 62.9%, by weight of a mixture of at least one semi-crystalline aliphatic polyamide and at least one amorphous polyamide as defined above, from 35 to 75%, in particular from 35 to 65% by weight of reinforcing fibers;

from 1 to 10% by weight of at least one impact modifier;

from 0 to 30% by weight of at least one filler;

from 1 to 10% by weight of at least one fluidifying agent; and from 0.1 to less than 2% by weight of additives;

the sum of the proportions of each constituent of said composition being equal to 100%.

Advantageously, said composition, in particular useful for injection molding, consists of:

from 25 to 62.5%, in particular from 35 to 62.5%, by weight of a mixture of at least one semi-crystalline aliphatic polyamide and at least one amorphous polyamide as defined above, from 35 to 75%, in particular from 35 to 65% by weight of reinforcing fibers;

from 1 to 10% by weight of at least one impact modifier;

from 0 to 30% by weight of at least one filler;

from 1 to 10% by weight of at least one fluidifying agent; and from 0.5 to less than 2% by weight of additives;

the sum of the proportions of each constituent of said composition being equal to 100%.

Advantageously, said composition, in particular useful for injection molding, consists of:

from 25 to 62.9%, in particular from 35 to 62.9%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 1 to 30% by weight of at least one filler;

from 1 to 10% by weight of at least one fluidifying agent; and from 0.1 to less than 2% by weight of additives;

the sum of the proportions of each constituent of said composition being equal to 100%.

Advantageously, the proportion of filler in the latter composition is from 5 to 30% by weight, in particular from 10 to 30% by weight, preferentially from 15 to 30% by weight, and the maximum of the mixture of semi-crystalline polyamide and amorphous polyamide present is then respectively 58.9%; 53.9% and 48.9%.

Advantageously, said composition, in particular useful for injection molding, consists of:

from 25 to 62.5%, in particular from 35 to 62.5%, by weight of a mixture of at least one semi-crystalline aliphatic polyamide and at least one amorphous polyamide as defined above, from 35 to 75%, in particular from 35 to 65% by weight of reinforcing fibers;

from 0 to 10% by weight of at least one impact modifier;

from 1 to 30% by weight of at least one filler;

from 1 to 10% by weight of at least one fluidifying agent; and from 0.5 to less than 2% by weight of additives;

the sum of the proportions of each constituent of said composition being equal to 100%.

Advantageously, the proportion of filler in the latter composition is from 5 to 30% by weight, in particular from 10 to 30% by weight, preferentially from 15 to 30% by weight, and the maximum of the mixture of semi-crystalline polyamide and amorphous polyamide present is then respectively 58.5%; 53.5% and 48.5%.

Advantageously, said composition, in particular useful for injection molding, consists of:

from 25 to 61.9%, in particular from 35 to 61.9%, by weight of a mixture of at least one semi-crystalline aliphatic polyamide and at least one amorphous polyamide as defined above, from 35 to 75%, in particular from 35 to 65% by weight of reinforcing fibers;

from 1 to 10% by weight of at least one impact modifier;

from 1 to 30% by weight of at least one filler;

from 1 to 10% by weight of at least one fluidifying agent; and from 0.1 to less than 2% by weight of additives;

the sum of the proportions of each constituent of said composition being equal to 100%.

Advantageously, the proportion of filler in the latter composition is from 5 to 30% by weight, in particular from 10 to 30% by weight, preferentially from 15 to 30% by weight, and the maximum of the mixture of semi-crystalline polyamide and amorphous polyamide present is then respectively 57.9%; 52.9% and 47.9%.

Advantageously, said composition, in particular useful for injection molding, consists of:

from 25 to 61.5%, in particular from 35 to 61.5%, by weight of a mixture of at least one semi-crystalline aliphatic polyamide and at least one amorphous polyamide as defined above, from 35 to 75, in particular from 35 to 65% by weight of reinforcing fibers;

from 1 to 10% by weight of at least one impact modifier;

from 1 to 30% by weight of at least one filler;

from 1 to 10% by weight of at least one fluidifying agent; and from 0.5 to less than 2% by weight of additives;

the sum of the proportions of each constituent of said composition being equal to 100%.

Advantageously, the proportion of filler in the latter composition is from 5 to 30% by weight, in particular from 10 to 30% by weight, preferentially from 15 to 30% by weight, and the maximum of the mixture of semi-crystalline polyamide and amorphous polyamide present is then respectively 57.5%; 52.5% and 47.5%.

In one embodiment, the proportion of filler in the compositions of the invention is from 0 to 28% by weight, in particular from 1 to 28% by weight, from 5 to 28% by weight, in particular from 10 to 28% by weight, preferentially from 15 to 28% by weight.

According to a third aspect, the invention relates to a method for the manufacture of the composition as defined hereinbefore, wherein the constituents of said composition are mixed by compounding, in particular in a twin-screw extruder, preferably a co-rotating extruder, a co-mixer or an internal mixer.

According to a fourth aspect, finally, the invention relates to a molded article obtainable from the composition defined hereinbefore, by injection molding.

Advantageously, said molded article is for electrical applications and electronics, and in particular selected from the group consisting of televisions, digital cameras, digital games, telephone parts, digital tablets, drones, printers, or computer parts.

In another embodiment, said molded article is a sports article, in particular a ski boot or a ski boot part or a rigid shoe with cleats, such as a soccer, rugby or football cleat, hockey footwear or a part of hockey footwear, or a running shoe, a golf ball or a part of a golf ball, or a lacrosse stick or also a hockey article such as a helmet or sport articles for protecting the head, shoulders, elbows, hands, knees, back or shins, such as helmets, gloves, shoulder pads, elbow pads, knee pads or shin guards.

EXAMPLES

The invention will be explained in more detail in the following examples.

Example 1: Synthesis of the (Co)Polyamides of the Invention

The various polyamides and copolyamides of the invention were prepared according to the usual techniques for polyamide and copolyamide synthesis.

Synthesis of PA B10, representative of the various homopolyamides:

the monomers bis-(3-methyl-4-aminocyclohexyl)-methane (B) and sebacic acid are loaded together into the reactor. The medium is first inerted to remove the oxygen that can generate yellowing or secondary reactions. Water can also be loaded to improve heat exchange and encourage the monomers to melt. Two temperature rise and pressure plateaus are conducted. The temperature (T°) and pressure conditions are chosen to allow the medium to melt. After having reached the maintenance conditions, degassing takes place to allow the polycondensation reaction. The medium stoppage conditions are reached, related to the desired viscosity, stirring is stopped and the extrusion and granulation can start. The granules obtained will then be compounded with the glass fibers.

Compounding

The compositions were prepared by mixing the polymer granules with the short fibers when melted. This mixing was carried out by compounding on a co-rotating twin-screw extruder with a screw diameter of 26 mm with a flat temperature profile (T°) at 290° C. for compositions CE1 to CE3 and I1 to I8 and at 230° C. for compositions I9 and I10 and CE4. The screw speed is 250 rpm and the flow rate is 20 kg/h.

The introduction of the glass fibers is achieved by side feeding.

The (co)polyamides, fibers, additives and possibly fillers are added during the compounding process in the main hopper for compositions CE1 to CE3 and I1 to I8.

For the compositions I8 and I9 and CE4, the resins and additives are introduced in the main hopper and the addition of the fillers is done by a first lateral gutter and the glass fibers in a second lateral gutter.

The following compositions were prepared (E=Example of the invention CE=Comparative example, the values correspond to percentages by weight):

TABLE 1

| | Composition | | | | | | | | | | |
|---|---|---|---|---|---|---|---|---|---|---|---|
| | CE1 | CE2 | CE3 | I1 | I2 | I3 | I4 | I5 | I6 | I7 | I8 |
| B10 | | | | | | | | | | 7.89 | 7.89 |
| PA1010 | | 39.46 | | | | | | | | | 31.57 |
| 11/B10 | | | | 7.90 | 9.90 | 11.80 | 9.90 | | 9.90 | | |
| 12/B10 | | | | | | | | 9.90 | | | |
| PA11 | 39.46 | | | 31.56 | 29.56 | 27.66 | 29.56 | | 24.56 | 31.57 | |
| PA12 | | | 39.46 | | | | | 29.56 | | | |
| PA11 prepolymer monoNH2 | | | | | | | | | 5.00 | | |
| Antioxidant | 0.24 | 0.24 | 0.24 | 0.24 | 0.24 | 0.24 | 0.24 | 0.24 | 0.24 | 0.24 | 0.24 |
| Calcium stearate | 0.30 | 0.30 | 0.30 | 0.30 | 0.30 | 0.30 | 0.30 | 0.30 | 0.30 | 0.30 | 0.30 |
| Glass fibers CSX3J- 451 | 60.00 | 60.00 | 60.00 | 60.00 | 60.00 | 60.00 | 60.00 | 60.00 | 60.00 | 60.00 | 60.00 | becomes viscous little by little and the reaction water formed is caused the nitrogen purge or applying a vacuum. When the stoppage conditions are reached, related to the desired viscosity, stirring is stopped and the extrusion and granulation can start. The granules obtained will then be compounded with the glass fibers.

Synthesis of PA 11/B10, representative of the various copolyamides:

the monomers aminoundecanoic acid, bis-(3-methyl-4-aminocyclohexyl)-methane (B) and sebacic acid are loaded together into the reactor according in the desired mass ratio. The medium is first inerted to remove the oxygen that can generate yellowing or secondary reactions. Water can also be loaded to improve heat exchange and encourage the monomers to melt. Two temperature rise and pressure plateaus are conducted. The temperature (T°) and pressure conditions are chosen to allow the medium to melt. After having reached the maintenance conditions, degassing takes place to allow the polycondensation reaction. The medium becomes viscous little by little and the reaction water formed is caused the nitrogen purge or applying a vacuum. When the

TABLE 2

| | Composition | | |
|---|---|---|---|
| | I9 | I10 | CE4 |
| 11/B10 | 9.00 | 7.40 | |
| PA11 | 35.40 | 29.50 | 47.46 |
| Flame retardant | 15 | 22.5 | 20 |
| PA11 prepolymer monoNH2 | | | |
| Antioxidant | 0.30 | 0.30 | 0.24 |
| Calcium stearate | 0.30 | 0.30 | 0.30 |
| Glass fibers CSX3J- 451 | 40.00 | 40.00 | 30.00 |
| MB BMNO Bk TL (Black masterbatch based on PA11) | | | 2.00 |

The values are percentages by weight.

BMNO: Rilsan® BMNO marketed by Arkema

Flame retardant: OP1312 (Clariant)

CSX3J-451 circular cross-section fibers marketed by Nittobo

Injection

100*100*1 mm³ plates were prepared by injecting the different compositions:

Injection temperature: 260° C.

Mold temperature: 80° C.

The cycle time is adjusted according to the compositions to allow injection of the compositions and is less than 50 seconds.

Compositions I1 to I10 all have a Tg relative to the comparative compositions CE1 to CE3 greater than 5° C.

The polyamide blends of compositions I1-I8 in Table 1 and I9-I10 in Table 2 all have crystallization enthalpies greater than 30 J/g.

Example 2: Change in Flexural Modulus with Temperature and Humidity

In order to evaluate the impact of humidity and temperature on the flexural modulus, the flexural modulus of specimens of the compositions obtained was measured on an Instron 5966 machine manufactured by the Instron company. The compositions are dried compositions and compositions saturated in water at 65° C. beforehand.

The tests were carried out at different temperatures, from −10° C. to 60° C.

In the injection-molded plates, specimens with dimensions according to ISO 178 but with a thickness of 1 mm were cut out in the direction of injection.

The results are shown in Tables 3 to 4 below:

TABLE 3

| modulus loss in saturated state (%) (M-10 − MT/M-10) × 100 | | | | | | | | | | | | | | |
|---|---|---|---|---|---|---|---|---|---|---|---|---|---|---|
|  | CE1 | CE2 | CE3 | CE4 | I1 | I2 | I3 | I4 | I5 | I6 | I7 | I8 | I9 | I10 |
| −10 | 0 | 0 | 0 | 0 | 0 | 0 | 0 | 0 | 0 | 0 | 0 | 0 | 0 | 0 |
| 0 | 4 | 3 | 3 | 5 | 1 | 1 | 1 | 1 | 1 | 1 | 2 | 3 | 3 | 6 |
| 10 | 11 | 9 | 10 | 12 | 3 | 3 | 3 | 3 | 3 | 3 | 5 | 6 | 6 | 9 |
| 20 | 22 | 20 | 21 | 22 | 6 | 5 | 4 | 5 | 5 | 4 | 9 | 10 | 9 | 12 |
| 30 | 32 | 31 | 33 | 32 | 10 | 8 | 8 | 9 | 8 | 8 | 15 | 17 | 15 | 17 |
| 40 | 40 | 39 | 39 | 39 | 17 | 13 | 11 | 14 | 14 | 12 | 24 | 25 | 21 | 23 |
| 50 | 45 | 43 | 45 | 43 | 23 | 20 | 17 | 21 | 21 | 18 | 30 | 31 | 28 | 30 |
| 60 | 47 | 45 | 48 | 45 | 30 | 28 | 24 | 28 | 28 | 24 | 37 | 38 | 34 | 35 |

TABLE 4

| Change in modulus between dry and saturated state (%) | | | | | | | | | | | | | | |
|---|---|---|---|---|---|---|---|---|---|---|---|---|---|---|
|  | CE1 | CE2 | CE3 | CE4 | I1 | I2 | I3 | I4 | I5 | I6 | I7 | I8 | I9 | I10 |
| 20° C. | 33 | 30 | 34 | 24 | 4 | −2 | −9 | 7 | 3 | −1 | 15 | 15 | 15 | 12 |

Table 4 shows that the compositions of the invention have a higher flexural modulus stability than the comparison compositions CE1 and CE4.

Example 3: Change in Tensile Modulus with Temperature and Humidity

In order to evaluate the impact of humidity and temperature on the tensile modulus, the tensile modulus of specimens of the compositions obtained was measured on an Instron 5966 machine manufactured by the Instron company. The compositions are dried compositions and compositions saturated in water at 65° C. beforehand.

The tests were carried out at different temperatures, from −10° C. to 60° C.

In the injection-molded plates, specimens with dimensions according to ISO 527 but with a thickness of 1 mm were cut out in the direction of injection.

The same trends as those observed for flexural modulus are found for tensile modulus.

The invention claimed is:

1. A method comprising preparing a semi-crystalline composition using a mixture of at least one semi-crystalline aliphatic polyamide and at least one amorphous polyamide wherein said at least one semi-crystalline aliphatic polyamide is obtained by polycondensation:

of at least one $C_6$ to $C_{18}$ amino acid, or of at least one $C_6$ to $C_{18}$ lactam, or of at least one $C_4$-$C_{36}$ aliphatic diamine Ca with at least one $C_4$-$C_{36}$ aliphatic dicarboxylic acid Cb;

wherein the semi-crystalline composition has a tensile or flexural modulus that does not vary by more than 25% in the temperature range from 10° C. to 40° C., said flexural modulus being determined according to ISO 178:2010 and said tensile modulus being determined according to ISO 2:2012;

wherein the Tg of said semi-crystalline composition, determined by DMA according to ISO 6721-11:2019, shows an increase greater than or equal to 5° C. with respect to the initial Tg of said semi-crystalline polyamide before mixing.

2. The method according to claim 1, wherein said at least one amorphous polyamide is a homopolyamide of formula XY or a copolyamide of formula A/XY, XY being a repeating unit obtained by polycondensation of a cycloaliphatic diamine (X) and a $C_4$-$C_{36}$ aliphatic dicarboxylic acid (Y) or an aromatic dicarboxylic acid (Y) and A is a repeating unit obtained by polycondensation of at least one $C_6$ to $C_{18}$ amino acid, or of at least one $C_6$ to $C_{18}$ lactam, or of at least one $C_4$-$C_{36}$ Ca diamine with at least one $C_4$-$C_{36}$ dicarboxylic acid Cb.

3. The method according to claim 2, wherein said at least one amorphous polyamide is a copolyamide of formula A/XY, A being obtained by polycondensation of at least one amino acid or obtained by polycondensation of at least one lactam, X being selected from bis-(3-methyl-4-aminocyclohexyl)-methane (B) or bis(p-aminocyclohexyl)-methane (P) or bis(aminomethyl) cyclohexane (BAC) and Y being terepthalic and/or isophthalic acid.

4. The method according to claim 2, wherein A/XY is selected from the units 11/BI/BT, 12/BI/BT, 11/BACI/BACT, 12/BACI/BACT, 11/BACI, 12/BACI, 11/PI/PT, 12/PI/PT and a mixture thereof.

5. The method according to claim 2, wherein said at least one amorphous polyamide is a copolyamide of formula A/XY, A being obtained by polycondensation of at least one amino acid or obtained by polycondensation of at least one lactam, X being selected from bis-(3-methyl-4-aminocyclohexyl)-methane (B) or bis(p-aminocyclohexyl)-methane (P) and Y being sebacic acid or dodecanedioic acid.

6. The method according to claim 2, wherein A/XY is selected from 11/B10, 11/B12, 11/P10, 11/P12, 12/B10, 12/B12, 12/P10, 12/P12, and a mixture thereof.

7. The method according to claim 2, wherein said at least one amorphous polyamide is a copolyamide of formula A/XY, A being obtained by polycondensation of at least one diamine Ca with at least one dicarboxylic acid Cb, X being selected from bis-(3-methyl-4-aminocyclohexyl)-methane (B) or bis(p-aminocyclohexyl)-methane (P) and Y being sebacic acid or dodecanedioic acid.

8. The method according to claim 2, wherein A/XY is selected from 1010/B10, 1010/B12, 1010/P10, 1010/P12, 1012/B10, 1012/B12, 1012/P10, 1012/P12, 1210/B10, 1210/B12, 1210/P10, 1210/P12, 1212/B10, 1212/B12, 1212/P10, 1212/P12, and a mixture thereof.

9. The method according to claim 2, wherein said at least one amorphous polyamide is a homopolyamide of formula XY, X being selected from bis-(3-methyl-4-aminocyclohexyl)-methane (B) or bis(p-aminocyclohexyl)-methane (P) and Y being sebacic acid or dodecanedioic acid.

10. The method according to claim 2, wherein XY is selected from units B10, B12, P10, and P12.

11. The method according to claim 1, wherein said semi-crystalline polyamide, has an enthalpy of crystallization greater than 30 J/g.

12. The method according to claim 1, wherein the proportion by weight of said amorphous polyamide is from 10 to 45% by weight with respect to the sum by weight of said at least one semi-crystalline polyamide and of said at least one amorphous polyamide.

13. The method according to claim 1, wherein the composition further comprises 35 to 75% by weight of reinforcing fibers.

14. The method according to claim 13, wherein the reinforcing fibers are selected from glass fibers, carbon fibers, and a mixture thereof.

15. The method according to claim 14, wherein the glass fibers are selected from glass fibers with a non-circular cross-section, glass fibers with a circular cross-section, and a mixture thereof.

16. A composition comprising:

from 25 to 65% by weight of the mixture of at least one semi-crystalline aliphatic polyamide and of at least one amorphous polyamide prepared by the method of claim 1, from 35 to 75% by weight of reinforcing fibers;

from 0 to 10% by weight of at least one impact modifier;

from 0 to 30% by weight of at least one filler which is different from reinforcing fibers;

from 0 to 10% by weight of at least one fluidifying agent which is different from the mixture of at least one semi-crystalline aliphatic polyamide and of at least one amorphous polyamide; and from 0 to less than 2% by weight of additives which are different from the mixture of at least one semi-crystalline aliphatic polyamide and of at least one amorphous polyamide, the impact modifier, the filler and the fluidifying agent;

the sum of the proportions of each constituent of said composition being equal to 100%.

17. A method of manufacturing the composition as defined in claim 16, wherein the constituents of the said composition are mixed by compounding a co-mixer or an internal mixer.

18. A molded article obtainable from the composition according to claim 16, by injection molding.

19. The molded article according to claim 18 for electrical applications and electronics selected from the group consisting of televisions, digital cameras, digital games, telephone parts, digital tablets, drones, printers, and computer parts.

20. The molded article according to claim 18, for sport applications, a ski boot, a ski boot part, a rigid shoe with cleats, a running shoe, a golf ball, a part of a golf ball, a lacrosse stick, or a hockey article.

\* \* \* \* \*